(12) United States Patent
Carr

(10) Patent No.: US 7,600,250 B2
(45) Date of Patent: *Oct. 6, 2009

(54) COMMUNICATING ANCILLARY INFORMATION ASSOCIATED WITH A PLURALITY OF AUDIO/VIDEO PROGRAMS

(75) Inventor: Wayne J. Carr, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 95 days.

This patent is subject to a terminal disclaimer.

(21) Appl. No.: 11/439,050

(22) Filed: May 23, 2006

(65) Prior Publication Data

US 2006/0212921 A1 Sep. 21, 2006

Related U.S. Application Data

(63) Continuation of application No. 09/321,939, filed on May 28, 1999, now Pat. No. 7,051,357.

(51) Int. Cl.
*H04N 7/173* (2006.01)

(52) U.S. Cl. .................. 725/110; 725/105; 725/109; 725/112; 725/51; 725/56; 725/32; 725/36; 725/71; 725/98; 725/118; 725/120; 725/148; 725/20; 709/217; 709/218; 709/219

(58) Field of Classification Search ........... 725/20, 725/32–33, 36, 71, 98, 108, 110, 117–118, 725/120, 136, 140

See application file for complete search history.

(56) References Cited

U.S. PATENT DOCUMENTS

| | | | | |
|---|---|---|---|---|
| 6,018,764 A * | 1/2000 | Field et al. | ................... | 709/217 |
| 6,025,837 A * | 2/2000 | Matthews et al. | ........... | 715/721 |
| 6,310,661 B1 * | 10/2001 | Arsenault | ................... | 348/725 |
| 6,317,791 B1 * | 11/2001 | Cohn et al. | ................. | 709/227 |
| 6,324,694 B1 * | 11/2001 | Watts et al. | ................... | 725/32 |
| 6,460,180 B1 * | 10/2002 | Park et al. | ..................... | 725/40 |
| 6,502,243 B1 * | 12/2002 | Thomas | ...................... | 725/110 |
| 6,522,342 B1 * | 2/2003 | Gagnon et al. | .............. | 715/716 |
| 6,557,172 B1 * | 4/2003 | Carr | ........................... | 725/139 |
| 6,571,392 B1 * | 5/2003 | Zigmond et al. | ............ | 725/110 |
| 7,051,357 B2 * | 5/2006 | Carr | ........................... | 725/110 |

* cited by examiner

*Primary Examiner*—Jason P Salce
(74) *Attorney, Agent, or Firm*—Trop, Pruner & Hu, P.C.

(57) ABSTRACT

A system includes a receiver and a communication interface. The receiver is adapted to tune to an audio/video portion over a transport medium. The communication interface is adapted to receive announcement data associated with the tuned audio/video content directed to a first addressable location and to receive a special announcement directed to the first addressable location. The special announcement indicates availability of the announcement data associated with the tuned audio/video program, and the announcement data is associated with the tuned audio/video content and indicates enhancement data is being transmitted. The controller is adapted to redirect the announcement data to a second addressable location other than the first addressable location in response to the special announcement.

17 Claims, 8 Drawing Sheets

COMMUNICATING ANCILLARY INFORMATION ASSOCIATED WITH A PLURALITY OF AUDIO/VIDEO PROGRAMS

This application is a continuation of application Ser. No. 09/321,939, filed May 28, 1999, now U.S. Pat. No. 7,051,357, entitled "COMMUNICATING ANCILLARY INFORMATION ASSOCIATED WITH A PLURALITY OF AUDIO/VIDEO PROGRAMS," which issued May 23, 2006.

BACKGROUND

The invention relates to communicating ancillary information associated with a plurality of audio/video programs, such as television content associated with a plurality of channels.

Ancillary information, such as program sub-titles, emergency messages, closed caption messages, and program guide information, may be transmitted with regular television content. More recently, other types of ancillary information that may be sent with television content include enhancement data such as web pages, multimedia information, or other digital data files. Ancillary information may be sent in the vertical blanking interval (VBI) of an analog television broadcast signal. Alternatively, the ancillary information may be sent with digital television content over a digital transport medium.

Various standards exist that provide for transmission of ancillary information with television content. One standard is the Advanced Television Enhancement Forum (ATVEF) Specification, Draft Version 1.1r26, dated Feb. 2, 1999. The ATVEF Specification is designed to provide for transmission of enhancement data along with television content in both analog and digital systems, such as cable systems, satellite systems, terrestrial systems, and so forth. The combination of the enhancement data and the television content may be referred to as enhanced television content. Enhanced television content provides more information and options to viewers. For example, a viewer may be presented with the option of viewing advertisements, educational information, and so forth, while watching regular television programming.

Transmission of enhanced television content, however, may increase bandwidth requirements of the transport medium between the transmission source and receiving sites. Thus, a need exists to provide for solutions that address bandwidth limitations of transport media as well as provide for greater flexibility in the transmission of such ancillary information.

DETAILED DESCRIPTION

In the following description, numerous details are set forth to provide an understanding of the present invention. However, it is to be understood by those skilled in the art that the present invention may be practiced without these details and that numerous variations or modifications from the described embodiments may be possible. For example, although reference is made to the Advanced Television Enhancement Forum (ATVEF) Specification, Draft Version 1.1 r26, dated Feb. 2, 1999, it is contemplated that other versions of the ATVEF Specification as well as other standards and techniques for transmission of ancillary information with content that includes audio data or video data (e.g., television content) may be included in further embodiments.

Figure 1A:
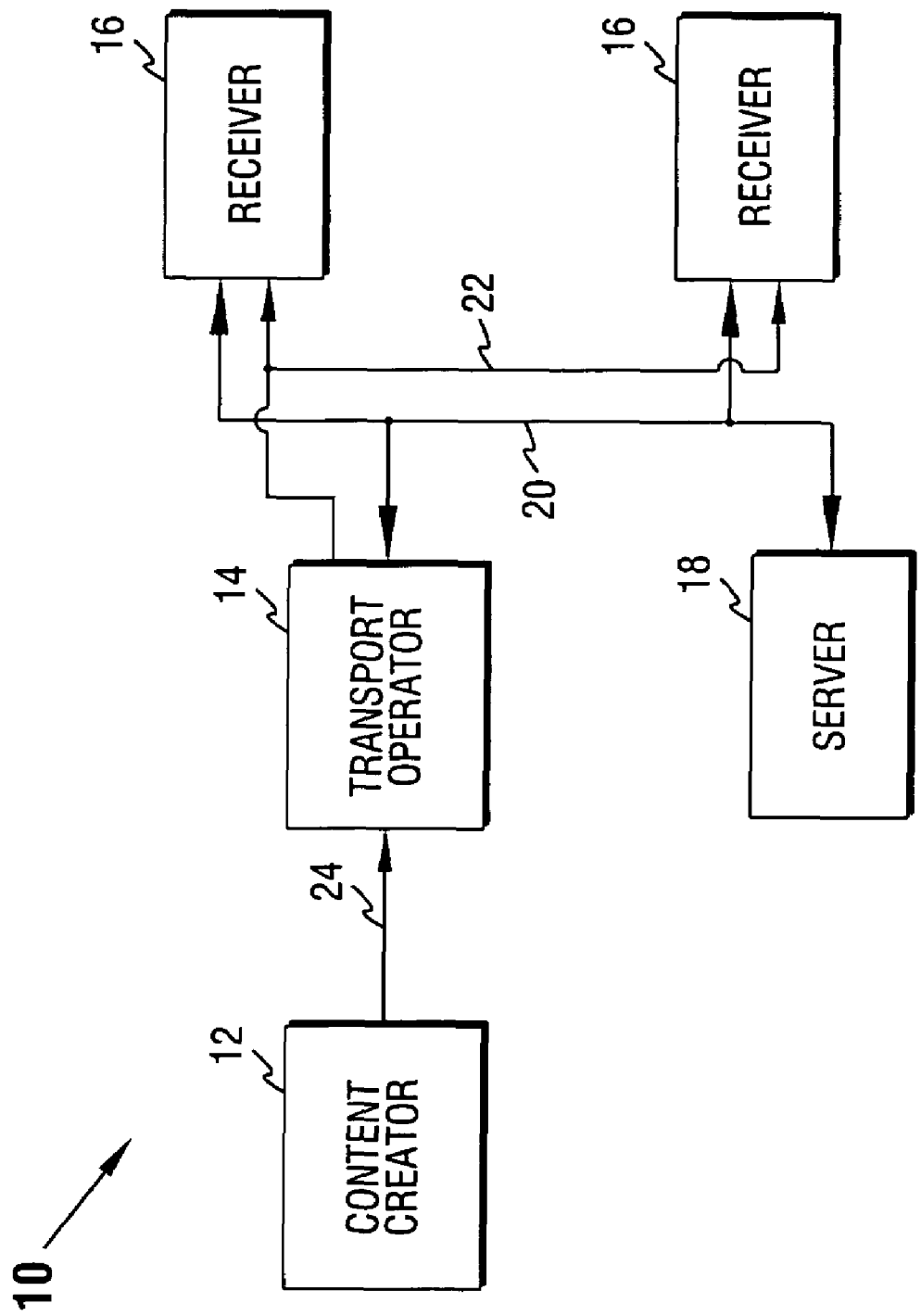
FIGS. 1A and 1B are block diagrams of embodiments of information delivery systems.

Referring to FIG. 1A, an information delivery system 10 according to one embodiment includes a content creator 12, a transport operator system 14, and a plurality of receivers 16. The receivers 16 may be located at various receiving sites, including homes, offices, entertainment facilities, or other locations. The content creator 12 originates enhancement data (or other type of ancillary information) and television content (or other type of content including audio and/or video data) to be transmitted by the transport operator system 14. Alternatively, the content creator 24 may create enhancement data with television content provided by another source to the transport operator system 14. Enhancement data may include graphics (e.g., web pages, multimedia information, or other digital data files), presentation layout, and synchronization information. The combination of the enhancement data and television content is referred to as enhanced television content.

The transport operator system 14 provides an enhanced television content delivery infrastructure that may include terrestrial, cable, satellite, or other types of transmission facilities (either analog or digital). The television content and enhancement data may be transmitted over a transport medium 22 which may be a terrestrial, cable, satellite, or other type of link, to the receivers 16. The receivers 16 may include televisions, set-top boxes, personal computers, or other types of systems adapted to receive television content and associated enhancement data.

As used in this description, the term audio/video (A/V) content is intended to include any type of audio and/or video data that may be transmitted or distributed to one or more receiving sites for presentation to viewers and/or listeners. As used here, A/V content may refer to content that may include both an audio and a video portion or one of an audio or video portion. Further, ancillary information other than enhancement data may be transmitted with the A/V content. For example, ancillary information may include program sub-titles, emergency messages, closed caption messages, and program guide information.

The receivers 16 may further be coupled to a secondary link 20 which may be a data delivery communications channel such as the Internet, a DOCSIS network (which is an interface for cable modems), or other communications link (whether uni-directional or bi-directional). DOCSIS stands for Data Over Cable Systems Interface Specifications, and is described in DOCSIS, Version 1.0, dated March 1998, as provided by the International Telecommunication Union (ITU). The secondary link 20 may be coupled to the transport operator system 14 and/or to one or more servers 18. According to some embodiments, portions of enhancement data associated with the A/V content transmitted over the transport medium 22 may be communicated over the secondary link 20 from the transport operator system 14, the one or more servers 18, or some combination of such systems.

In an alternate embodiment, another type of secondary data path can be part of the A/V transmission itself, but not tightly tied to a particular A/V channel. For instance, in MPEG-2 based systems like ATSC (Advanced Television Systems Committee) or DVB (Digital Video Broadcasting), transport stream programs correspond to what is commonly thought of as TV channels. MPEG stands for Moving Picture Experts Group, and the MPEG-2 standard is described in ISO/IEC 13818-1 (MPEG-2 Systems), ISO/IEC 13818-2 (MPEG-2 Video) and ISO/IEC 13818-3 (MPEG-2 Audio), dated in 1994 and provided by the International Organization for Standardization (ISO) and the International Electrotechnical Commission (IEC). A description of ATSC may be found in "Guide to the Use of the ATSC Digital Television Standard," dated October 1995. DVB standards may be available from the web site {http://www.etsi.org}.

These transport stream programs can contain audio, video and data (e.g., ancillary information), with all of them tightly associated with that single transport stream program. When a user tunes to the transport stream program, the receiving device knows the audio, video, and data that are associated because they are marked as all being part of the same program. In addition, other transport stream programs can be created that contain no audio or video, only data. In this case, ancillary information associated with a plurality of audio/video programs could be carried in a single data-only transport stream program. This creates the same situation as if that ancillary data was carried outside the transport that carries the audio/video program. Data that is intended to be associated with a particular audio/video program is transported separate from it and instead may be multiplexed onto a single delivery mechanism (e.g., a data-only transport stream program) that carries ancillary information for many audio/video programs. The problem then becomes being able to re-associate ancillary information with the proper audio/video program at the receiving end.

One standard for describing transmission of enhancement data with television content is the ATVEF specification, with one version described in ATVEF Specification, Draft Version 1.1r26, dated Feb. 2, 1999. Enhancement data may be transmitted in a number of different ways from the transport operator system 14 to the receivers 16, depending on the type of transport medium 22. For example, with an analog transport medium such as the National Television System Committee (NTSC) Standard of the Electronics Industries Association, portions of the enhancement data may be sent in the vertical blanking interval (VBI) of the NTSC transmission. A description of NTSC may be found in Keith Jack, "Video Demystified: A Handbook For the Digital Engineer," HighText Publications (2d Ed. 1996). Other types of transport media (analog or digital) may provide different mechanisms of communicating the enhancement data.

Enhancement data according to the ATVEF Specification may include enhancements each having the following components: an ATVEF announcement, a resource, and a trigger. The three components may be transmitted using Internet Protocol (IP) multicast to the receivers. An IP multicast standard is described in Request for Comment (RFC) 1301, entitled "Multicast Transport Protocol." RFCs may be available at website address {http://www.ietf.org/rfc.html}.

Generally, an ATVEF announcement indicates that enhancement data is being transmitted, a resource includes one or more files that contain the enhancement data, and a trigger synchronizes the enhancement data with the TV transmission. An announcement may describe the location of both the resource stream and the trigger stream. For each television (TV) channel, one or more enhancements may be offered as choices presented to the user, who can select which of the enhancements, if any, to view. The ATVEF Specification may utilize a one-way transmission protocol (the Unidirectional Hypertext Transfer Protocol or UHTTP, described in the ATVEF Specification) to deliver resource data.

The announcements, resources, and triggers associated with an A/V channel may be delivered at about the same time as and with the transmission of the A/V content on that channel. Conventionally, for each enhancement, the resource stream may be delivered along with the announcement, with the resource stream stored locally in the receiver 16. If a viewer so desires, the enhancement data can be retrieved at the receiver from local storage for viewing.

Conventionally, ATVEF announcements arrive at an expected location, such as a predetermined Internet Protocol (IP) address and port. The Internet protocol is described in RFC 791, entitled "Internet Protocol," dated September 1981. The locations of the resource and trigger streams specified in the ATVEF Specification may be described as IP addresses and ports where the resources and triggers may be found. The ATVEF announcement may be a Session Description Protocol (SDP) announcement, as described in RFC 2327, entitled "SDP: Session Description Protocol," dated April 1998.

In current ATVEF systems, the enhancement data including announcements are delivered with the A/V content associated with each TV channel. However, announcements for multiple TV channels are not grouped for arrival at the ATVEF announcement IP address and port in the receivers 16, as the one or more announcements of the currently tuned TV channel are received at the ATVEF announcement IP address and port along with the A/V content stream of the currently tuned TV channel. Thus, conventionally, when tuning from one TV channel to another, the receiver assumes that the source of the data network changes correspondingly, that is, only announcements for the currently tuned TV channel flow on the announcement IP address and port. For example, when a receiver is tuned to channel B, the enhancement data of channel B is received at the announcement IP address and port but not enhancement data associated with other channels. According to the current ATVEF Specification, ATVEF announcements for channels other than the currently tuned channel cannot arrive in the ATVEF announcement IP address and port. The enhancement data is thus tightly coupled to the A/V content associated with each TV channel so that the receiver can easily associate the enhancement data with the A/V content of the currently tuned TV channel in a conventional ATVEF system.

To provide for greater flexibility and/or to alleviate bandwidth concerns of the transport medium 22, some embodiments of the invention transmit (using IP multicast) enhancement data associated with multiple A/V channels (e.g., TV channels) over a link that is separate from the transport medium used to transmit A/V content (or, alternatively, that is part of the same delivery mechanism as the A/V content but is not associated with any A/V channel, e.g., an MPEG-2 transport stream with ancillary information in a data-only program separate from the A/V programs). The separate delivery mechanism to deliver the A/V content may be a separate transport stream or a separate link 20 such as a general purpose data link or some other type of communications link. Thus, according to some embodiments, enhancement data is separated from the A/V data at the transport operator system 14 (or alternatively, at another source), with the A/V content transmitted over the transport medium 22 and the enhancement data transmitted over the secondary link 20 (or a separate transport stream).

In the ensuing description, reference is made to receiving enhancement data received over the secondary link 20; however, it is contemplated that the enhancement data or other type of ancillary information may be received over a separate transport stream such as that used with MPEG-2 delivery systems. In addition, reference is made to tuning to a specific A/V channel (e.g., TV channel) at the receiving end. It is contemplated, however, that the receiver system can be tuning instead to one of the A/V transport stream programs in an MPEG-2 based systems.

Thus, generally, tuning to an A/V program may include tuning to A/V channels (e.g., TV channels), to transport stream programs (e.g., in an MPEG based system), or to other separations or segments of A/V content. Also, associating ancillary information with an A/V program can thus refer to associating ancillary information with an A/V channel, a transport stream program, or other A/V separations or segments.

In accordance with some embodiments, the enhancement data associated with multiple A/V channels may be grouped and stored in the transport operator system 14 and/or the one or more servers 18 and multiplexed into a transmission stream on the secondary link 20. Consequently, according to some embodiments, enhancement data associated with multiple A/V channels may be combined into a transmission stream on the secondary link 20. At the receiving end, the combined stream of enhancement data is separated and associated with a currently tuned A/V channel.

In accordance with some embodiments, indications (referred to as special announcements) may be transmitted over the secondary link 20 along with the enhancement data to aid in the association of enhancement data with the tuned channel. In a conventional ATVEF system, such special announcements are not employed because enhancement data is tightly coupled with the A/V content. Upon receipt of the special announcements, each receiver 16 determines the A/V channel that the receiver is tuned to and identifies the special announcement associated with the tuned channel. The special announcement includes data identifying locations of one or more ATVEF announcements associated with that A/V channel. At the receiving end, instead of ATVEF announcements arriving at the expected location (e.g., predetermined IP address and port), the special announcements arrive at the expected location. Using information in a special announcement, each receiver 16 can then locate the one or more ATVEF announcements received over the secondary link 20 and associate them with the tuned channel. From the retrieved ATVEF announcements, locations of resource files and triggers can then be conventionally determined for retrieval and presentation. The resource files of the enhancement data can then be combined with the A/V content for presentation (audio or video presentation or both).

Thus, effectively, some embodiments of the invention separate A/V content and enhancement data at the source (e.g., the transport operator system 14). The A/V content is transmitted over the transport medium 22, while the enhancement data (along with special announcements) associated with multiple A/V channels are combined and multiplexed onto a separate transmission stream. At the receiving end (e.g., receivers 16), the combined enhancement data are separated (demultiplexed) and associated with a currently tuned A/V channel.

Figure 1B:
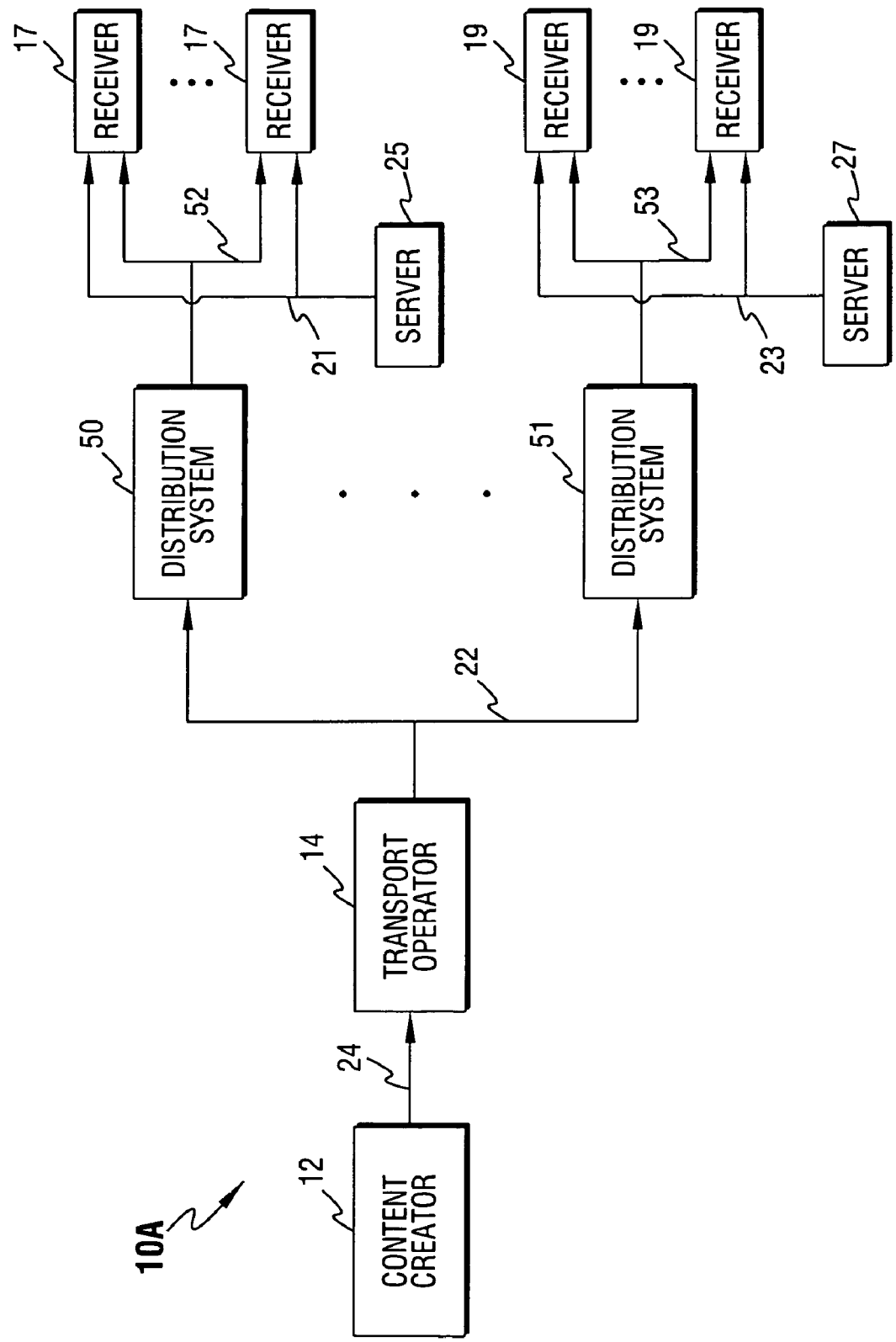

Referring to FIG. 1B, an alternative embodiment of an information delivery system 10A is illustrated. The system 10A includes a content creator 12 and a transport operator system 14 to transmit A/V content with enhancement data over the transport medium 22. Unlike the information delivery system 10 of FIG. 1A, the system 10A includes distribution systems 50 and 51, coupled to receive A/V content and enhancement data from the transport operator system 14. The distribution systems 50, 51 may include geographic regional centers, for example, adapted to receive enhanced TV content and to distribute the content locally in a predefined geographic region. Each distribution system 50 or 51 transmits A/V content and enhancement data to receivers 17 or 19, respectively. In addition, the receivers 17 or 19 are coupled by respective secondary link 21 or 23 (e.g., Internet, DOCIS link, or other type link) to respective distribution system 50 or 51.

In the embodiment of FIG. 1B, the distribution system 50 or 51 separates the A/V content from the enhancement data, with the A/V content sent over transport medium 52 or 53 and combined enhancement data associated with multiple A/V channels transmitted over data link 21 or 23. Alternatively, the enhancement data may be transmitted by one or more servers 25, 27 over the secondary links 21, 23.

Special announcements may also be sent by the distribution system 50 or 51 over the secondary link 21 or 23. As with receivers 16 in the FIG. 1A embodiment, the receivers 17 or 19 are able to demultiplex the combined enhancement data (sent along with the special announcements) to associate enhancement data with a tuned A/V channel.

Figure 2:
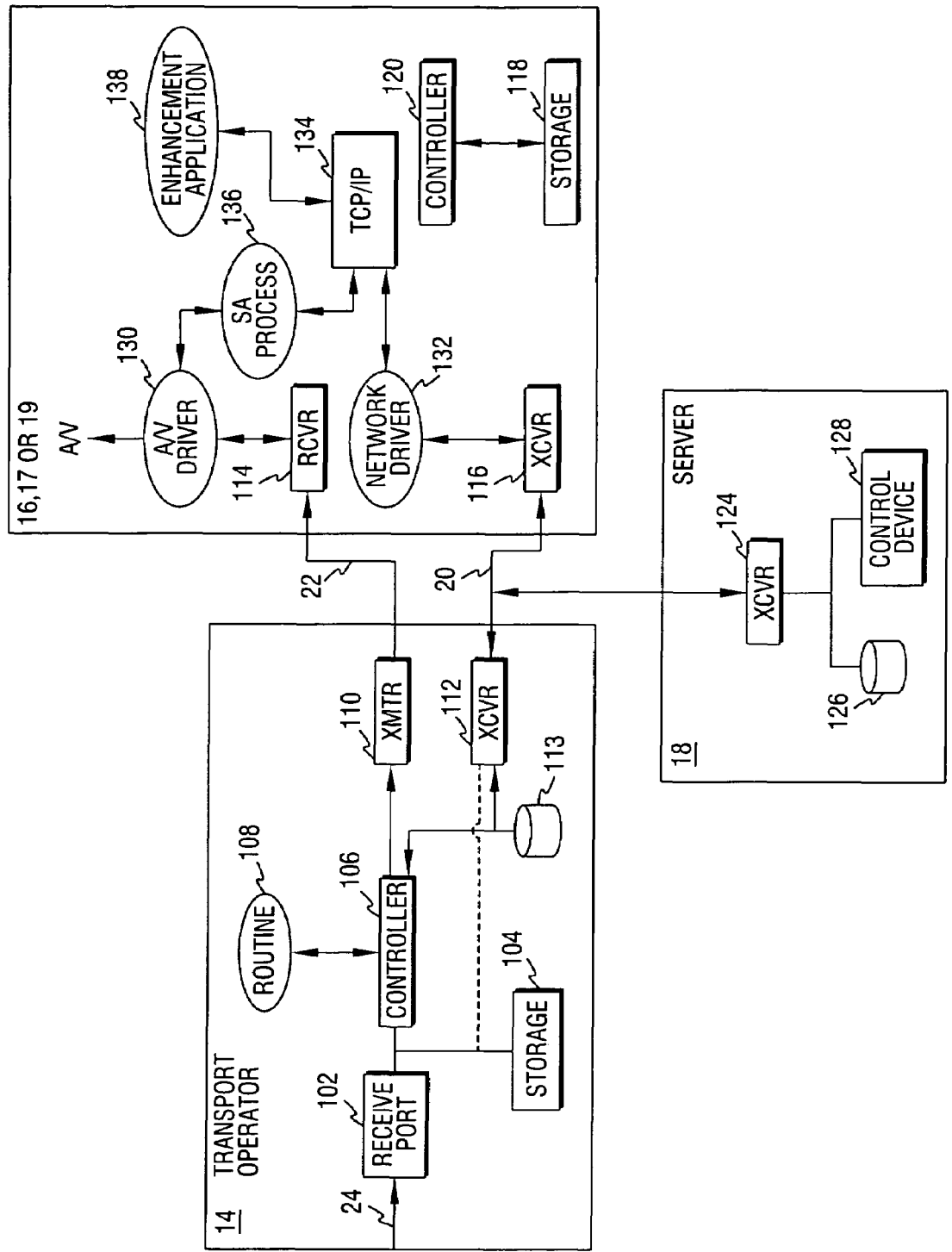
FIG. 2 is a block diagram of a transport operator system, receiving system, and server according to one embodiment in the information delivery systems of FIGS. 1A and 1B.

Referring to FIG. 2, components in the transport operator system 14, receiving system (receiver 16, 17, or 19) and the server 18 in the system 10 of FIG. 1A are illustrated. With some modifications, the distribution system 50 and 51 may have similar components as the transport operator system 14. The transport operator system 14 may include a receiving port 102 to receive information from the content creator 12 over a link 24. The received enhancement data may be provided to a controller 106 in the transport operator system 14. A/V content may be received with the enhancement data through port 102 or through a separate A/V receive port (not shown). The controller 106 may be run under control of a software routine 108 (referred to as a transport routine). The transport routine 108 may initially be stored in a storage medium 104 and loaded by the controller 106 for execution. Instructions and data of the transport routine 108 may also be stored in the storage medium 104. According to some embodiments, the controller 106 may be adapted to separate the A/V content from the enhancement data before separate transmission of the A/V content over the transport medium 22. The controller 106 may also create special announcements to be transmitted with enhancement data over a separate link (e.g., link 20). The enhancement data and special announcements may be stored in a storage medium 113, which may be transmitted over the secondary link 20 through a transceiver 112. Alternatively, the enhancement data and special announcements may be transmitted over the transport medium 22 with the A/V content but in a separate transport stream program. In the latter embodiment, different parts of the transport routine 108 (or alternatively, different routines) may handle transmission of both the A/V content and the enhancement data and special announcements. The transceiver 112 may be a telephone modem, a cable modem, or any other type of analog or digital transceiver or transmitter adapted to communicate over the secondary link 20.

Enhancement data may be stored in a storage medium 126 in the server 18 in addition to or instead of the enhancement data stored in the transport operator system 14. The server 18 further includes a transceiver 124 coupled to the secondary link 20 and a control device 128. More than one server 18 may be coupled to the secondary link 20 to store additional enhancement data. Alternatively, a plurality of servers 18 may be coupled to the receivers 16 over separate links.

In the receiving system (receiver 16, 17, or 19), a receiver circuit 114 (e.g., a TV tuner card) is adapted to receive content over the transport medium 22 and a transceiver 116 is adapted to communicate over the secondary link 20. The receiving circuit 114 may be associated with an A/V device driver routine 130 that forwards the received A/V content to application software adapted to process and present the A/V content in the receiving system. The transceiver 116 may be associated with a network device driver 132 to receive enhancement data from the link 20.

In one embodiment, the network device driver 132 may send received data to a TCP/IP (Transmission Control Protocol/Internet Protocol) stack 134. TCP is described in RFC 793, entitled "Transmission Control Protocol," dated September 1991. Data flows through the TCP/IP stack 134 to application software, including an enhancement routine 138 for receiving and processing enhancement data and a special announcement routine (SA routine) 136 to receive and process special announcements. In an alternative arrangement, the SA routine 136 may be part of the enhancement routine 138. The application routines, device drivers, and other routines or programs may be executable on a controller 120. Such routines or programs may be initially stored in a storage medium 118 and loaded by the controller 120 for execution. The SA routine 136 is capable of associating enhancement data received over the secondary link 20 to the currently tuned A/V channel. The SA routine 136 may then combine the associated enhancement data with the A/V content of the currently tuned TV channel for presentation. Alternatively, the enhancement data and special announcements may arrive in a separate transport stream program (e.g., such as those in MPEG based systems) over the transport medium 22, in which case it may be different parts of the SA routine 136 (or different routines) that process receipt of the enhancement data and A/V content.

Figure 6:
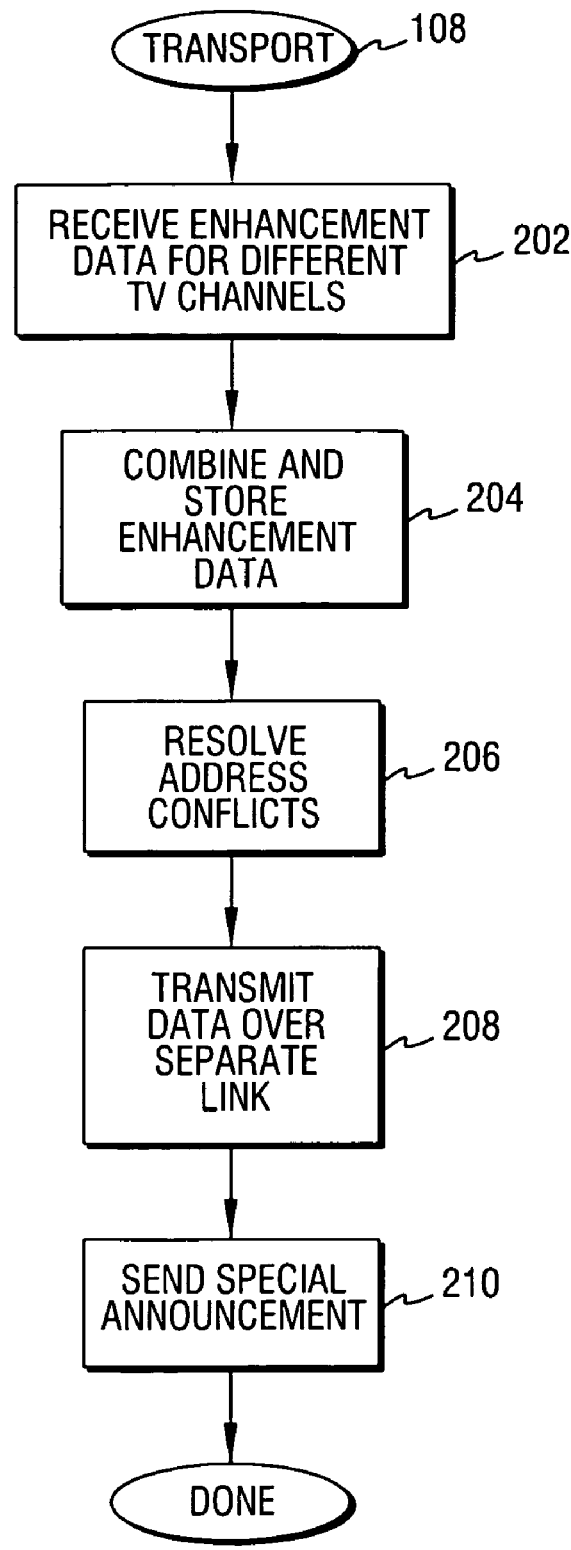
FIG. 6 is a flow diagram of a transport routine according to one embodiment.

Referring to FIG. 6, a process according to one embodiment performed in the transport operator system 14 by the controller 106 (under control of the transport routine 108) is described. Enhancement data for different A/V channels are received (at 202) by the controller 106. The enhancement data for the different TV channels, which may be in the form of IP datagrams, for example, may then be combined (at 204) and stored in the storage medium 113. Alternatively, the enhancement data may be communicated to the server 18 for storage and transmission over the link 20. Resources and triggers associated with the different TV channels are stored at their respective IP addresses. The controller 106 detects presence of announcements when they appear at the ATVEF announcement address and port in the transport operator system 14. The announcements are separated out onto different IP addresses corresponding to the A/V channels, with one IP address assigned for the one or more ATVEF announcements associated with each A/V channel. Such announcements are not sent along with the A/V content on the ATVEF announcement address and port, as conventionally done, but instead are stored at a different announcement IP address.

The controller 106 next resolves (at 206) any IP address conflicts that may occur among IP datagrams containing resource and trigger streams. If a clash in IP addresses exists for IP datagrams of the resource and trigger data for different TV channel sources, the IP addresses of the datagrams may be changed to avoid collision. Conventional techniques exist to detect and resolve IP address conflicts. Alternatively, conventional techniques also exist for assigning IP multicast addresses (e.g., static owned address allocation) to avoid creating conflicting addresses.

The enhancement data, including announcements, resources, and triggers, are transmitted (at 208) over the secondary link 20. A special announcement is also transmitted (at 210) with the enhancement data to indicate that ATVEF announcements associated with the A/V channel is available from a different source.

Figure 3A:
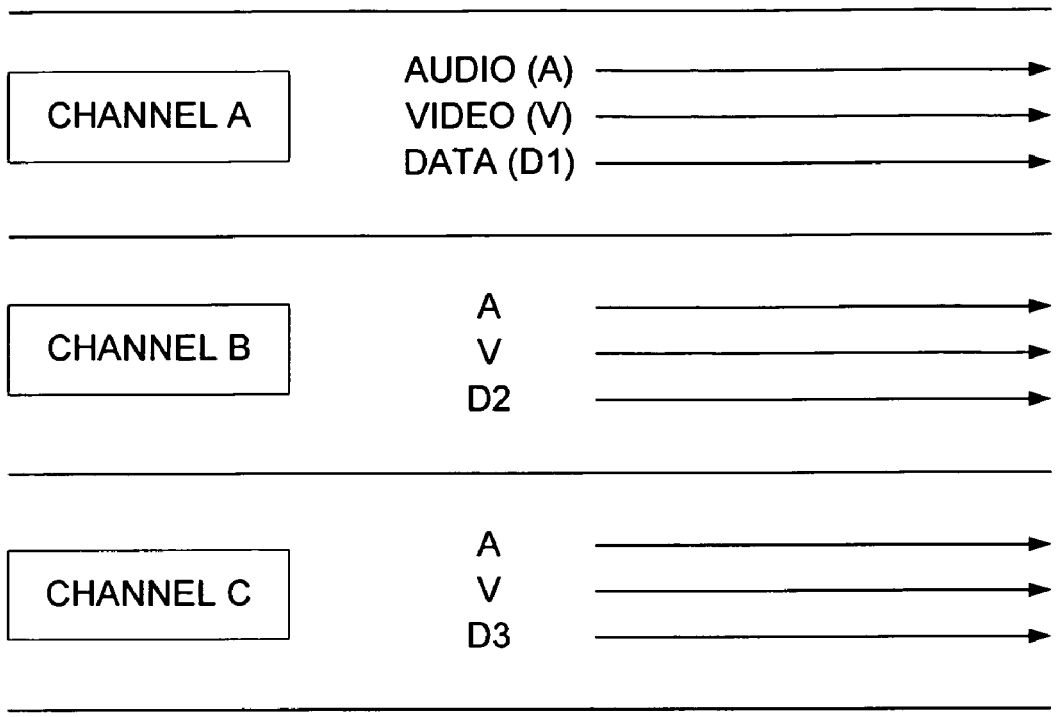
FIGS. 3A, 3B, 4, and 5 illustrate transmission and receipt of audio and video content and associated ancillary information according to an embodiment.
Figure 3B:
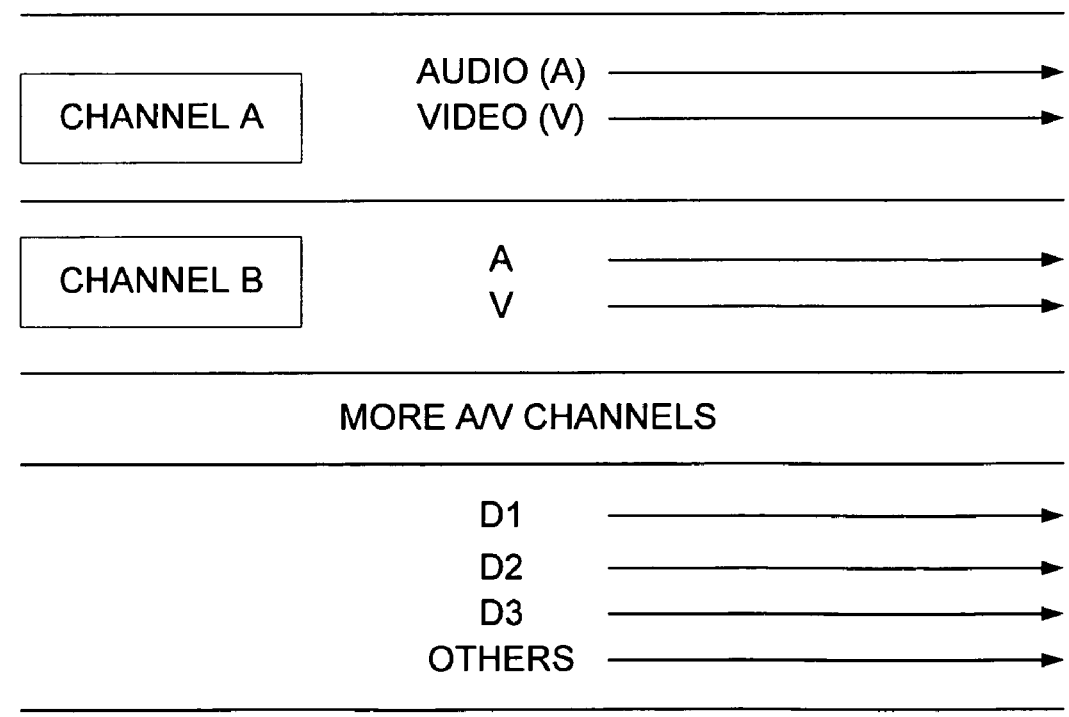

Separation of the enhancement data and the A/V content is illustrated in FIGS. 3A and 3B. As illustrated in FIG. 3A, each of multiple A/V channels A, B, and C includes audio data (A), video data (V), and enhancement data (D). The enhancement data of the multiple channels are separated from the A/V content, as illustrated in FIG. 3B, so that the A/V content is transmitted without an ATVEF announcement, resource, or trigger. The enhancement data (D) of the different TV channels are multiplexed onto a data network (e.g., the secondary link 20) for transmission to or for retrieval by the receivers 16.

Thus, according to some embodiments of the invention, the ATVEF announcements are not sent on the usual ATVEF announcement address and port. Instead, ATVEF announcements for a single A/V channel are made available on their own announcement IP address. Instead of the regular ATVEF announcements, a special announcement is transmitted on the ATVEF announcement address and port to indicate that the ATVEF announcements for the TV channel have been redirected. In other embodiments in which ATVEF is not used, announcements may refer to other indications of presence of ancillary information.

According to the current ATVEF Specification, an ATVEF announcement sent on the ATVEF announcement address and port includes an attribute "a=type:tve" to identify that enhancement data is being sent. According to one embodiment of the invention, instead of including the attribute "a=type:tve," the special announcement includes a different identifier attribute, e.g., "a=type:x-tvemult" or other predetermined attribute. In one embodiment, the special announcement does not locate resource files and triggers for the enhanced TV program, but instead locates the announcement data for each TV channel. The special announcement is not recognized as a standard ATVEF announcement because of the lack of the "a=type:tve" attribute.

In one embodiment, the special announcement may include the following information: TV network name (if any), located in a first string, e.g., "a=x-tvnet:networknamestring"; TV station call letters, located in a second string, e.g., "a=x-tvstation:stationnamestring"; and/or major and minor channel numbers for tuning, located in a third string, e.g., "a=x-tvtune:majorchannelnumber:minorchannelnumber". The information of the fields in the special announcement may be used to tie the special announcement to a particular TV channel through an electronic program guide or other channel mapping mechanism that may be made available to the receiving system.

Figure 7:
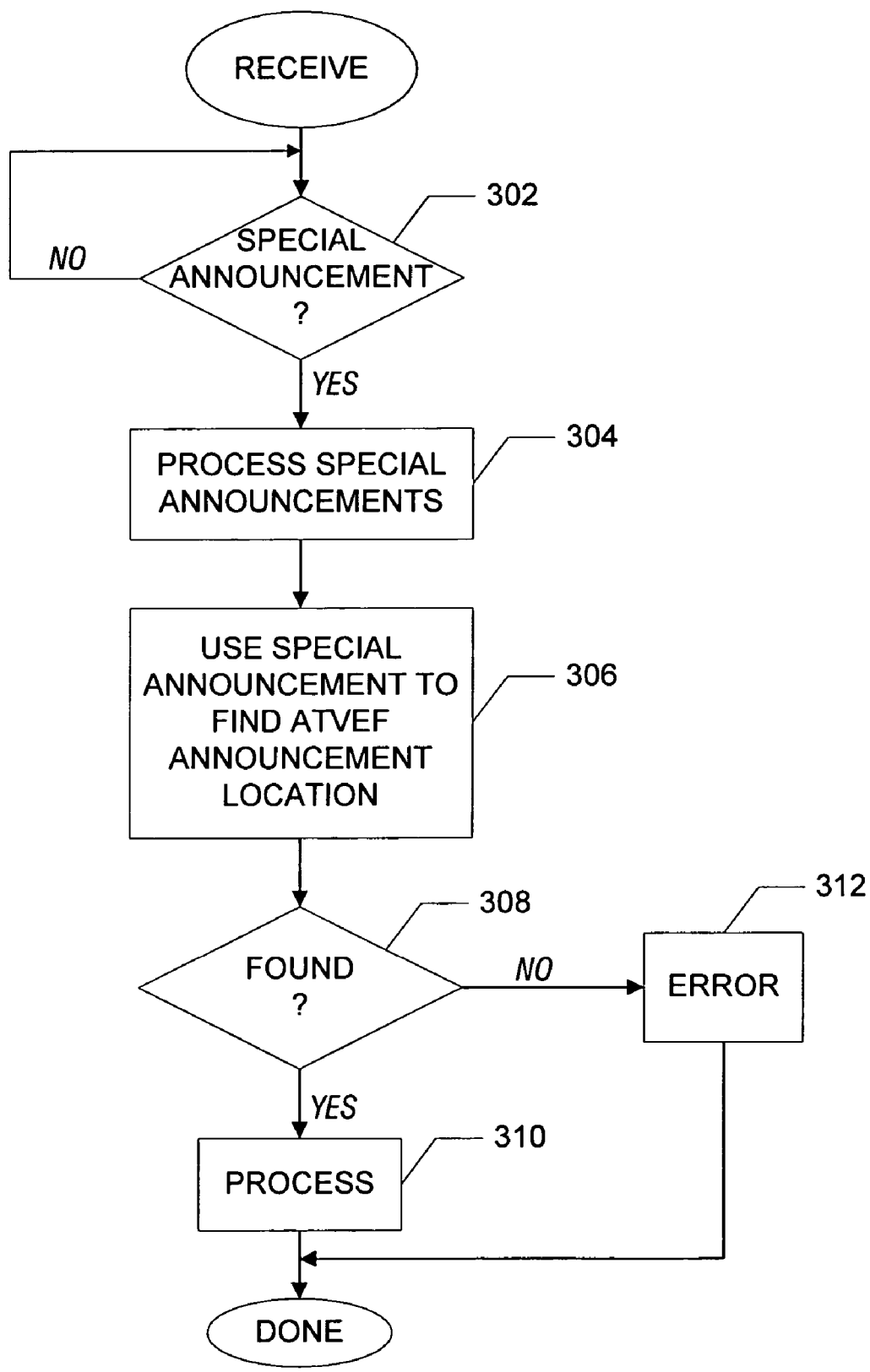
FIG. 7 is a flow diagram of a routine or routines adapted to receive ancillary information according to one embodiment.

Referring to FIG. 7, a process according to one embodiment performed by the controller 120 (under control of the SA routine 136 and/or enhancement routine 138 in each receiver 16, 17, or 19 is illustrated. On the receiving side, the controller 120 determines if one or more special announcements have been received (at 302) on the predetermined ATVEF SDP address and port. Using the strings listed above, the controller 120 processes the special announcements until one for the currently tuned A/V channel is found (at 304). It then uses the special announcement to find the IP address and port for the ATVEF announcements for the currently tuned channel (at 306). At this point, the ATVEF announcements that normally would have been transmitted over the transport medium 22 along with the A/V content for the tuned TV channel have been located. If the ATVEF announcement or announcements are found, then the identified ATVEF announcements are processed (at 310) to locate resource files and triggers. Otherwise, an error is indicated (at 312).

The processing performed by the controller 120 (at 310) may be performed in one of various ways. In one embodiment in which the SA routine 136 is part of the enhancement routine 138, the controller 120 in the receiver 16 may directly access the ATVEF announcements located at the indicated IP address, from which the resource and trigger files may be located.

In an alternative embodiment in which the SA routine 136 and enhancement routine 138 are separate, the SA routine 136 first processes received special announcements. Based on the currently tuned A/V channel, the SA routine 136 identifies the one or more announcements associated with the tuned channel and retransmits or redirects them onto the expected ATVEF IP address and port so that the enhancement routine 138 can properly process the ATVEF announcements. The enhancement routine 138 can then proceed to locate the resource and trigger stream based on the received ATVEF announcements. In this alternative embodiment, the enhancement routine 138 need not be modified—instead, the responsibility of processing special announcements is placed on the SA routine 136. An advantage of this alternative embodiment is that existing receiving systems may be easily retrofitted with the SA routine 136 by simply loading the component 136 from storage media (such as floppy diskettes or CD or DVD media) or down-loading the component 136 from a data network (such as the Internet).

Figure 4:
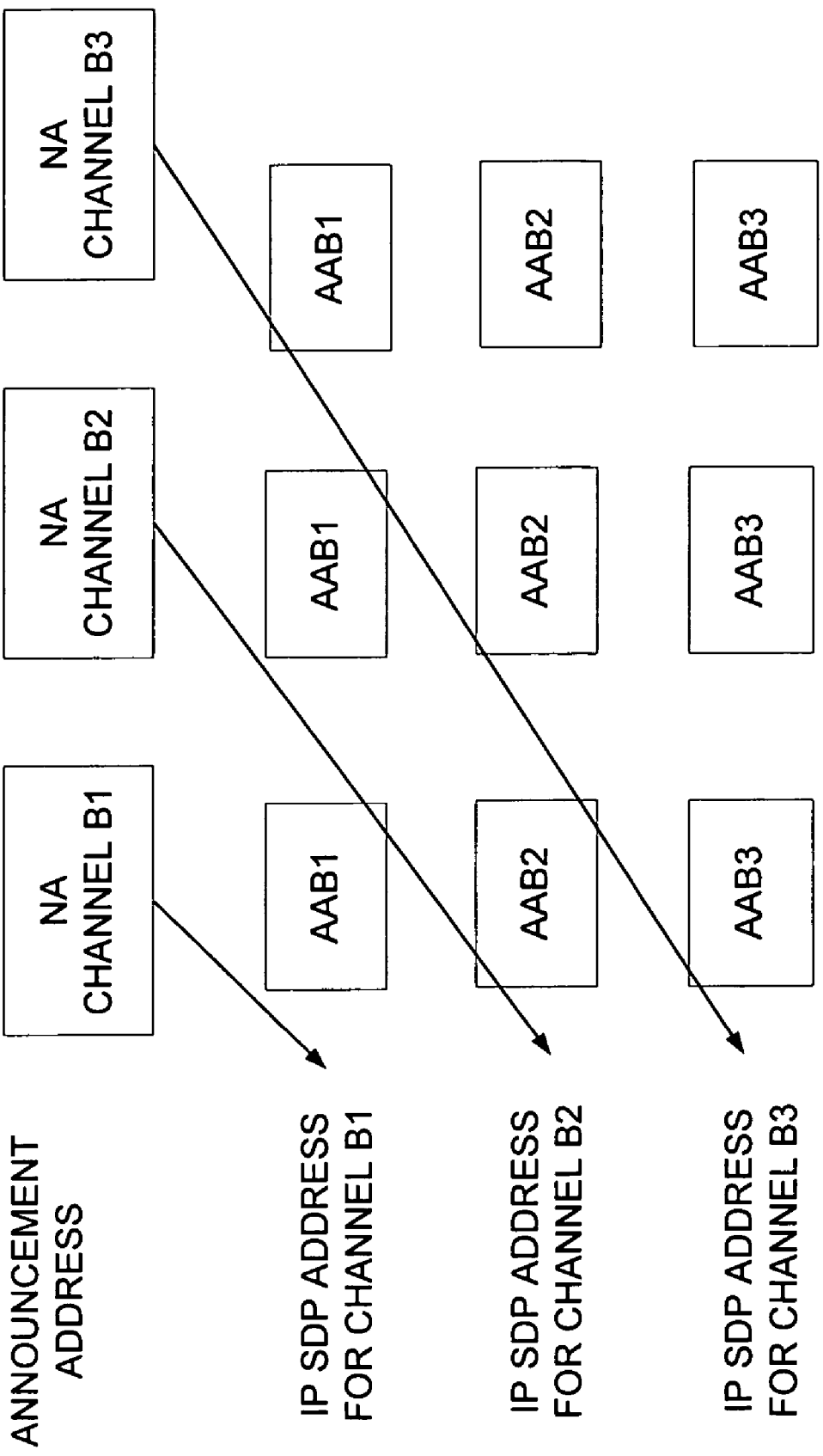
Figure 5:
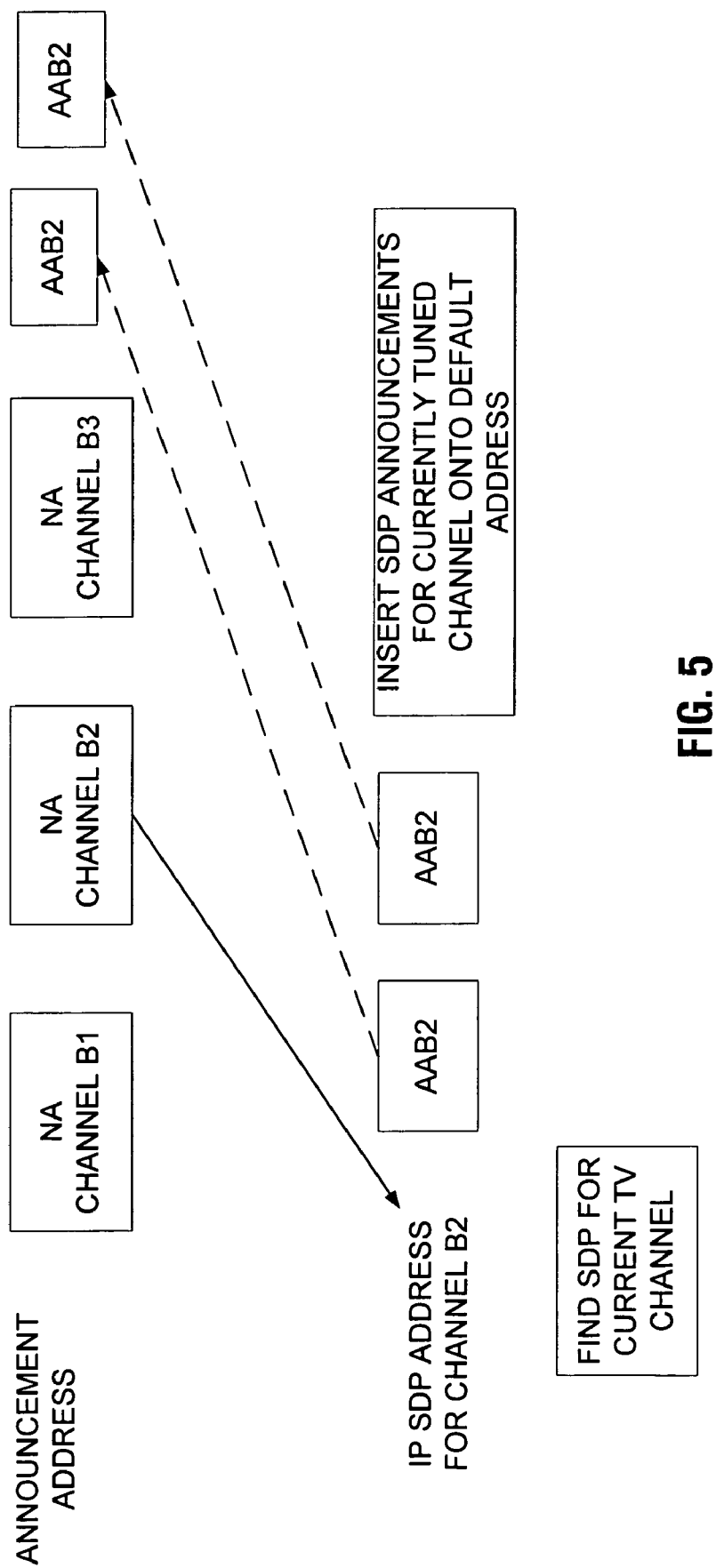

Referring to FIGS. 4 and 5, special announcements NA for channels B1, B2, and B3, received by the receiving system contain pointers to IP addresses of the ATVEF announcements AAB1, AAB2, and AAB3 for channels B1, B2, and B3, respectively. Assuming that channel B2 is the one currently tuned, the controller 120 (under control of the SA routine 136) in the receiving system identifies the received special announcement NA for channel B2. From information in the special announcement NA, the controller 120 may locate the announcements AAB2 associated with channel B2 for retransmission to the ATVEF announcement address and port. Upon retransmission of the ATVEF announcements AAB2 to the expected IP address and port, resource and trigger files located by the announcements AAB2 may then be conventionally processed by the enhancement routine 138.

Thus, a system has been described in which enhancement data associated with multiple TV programs or channels may be sent as a group to one or more receivers. A predetermined indication (e.g., a special announcement) may be used to identify the location of ATVEF announcements for enhancement data of the tuned A/V channel. The ATVEF announcements may then be received and processed to obtain locations of resource and trigger files.

Some embodiments of the invention may include one or more of the following advantages. Enhancement data for multiple channels or programs may be carried over a general purpose data network separately from the A/V content transport medium. This provides greater flexibility in how the enhancement data may be transmitted. For example, if the transport medium for delivering the A/V content does not have sufficient bandwidth for sending large amounts of enhancement data, the separate channel may provide a mechanism of increasing that bandwidth. In cases where the A/V content is transmitted over an analog transport medium (such as an NTSC medium), delivering enhancement data over a separate channel such as a DOCSIS link, the Internet, or other communications link, avoids the expense of employing a VBI data decoder in each receiver. Additionally, the viewer may be able to watch the enhancement data portion of the TV program separately from the A/V content if the viewer has a separate TV and personal computer.

Further embodiments of the invention may include transmission sources to transmit A/V content other than TV content. Ancillary information associated with such A/V content may be similarly made available over a separate link.

Various software or firmware (formed of modules, routines, or other layers, for example) may be stored or otherwise tangibly embodied in one or more machine-readable storage media in the information delivery system. Storage media suitable for tangibly embodying software and firmware instructions may include different forms of memory including semiconductor memory devices such as dynamic or static random access memories, erasable and programmable read-only memories (EPROMs), electrically erasable and programmable read-only memories (EEPROMs), and flash memories; magnetic disks such as fixed, floppy and removable disks; other magnetic media including tape; and optical media such as CD or DVD disks. The instructions stored in the one or more storage media when executed cause the information delivery system to perform programmed acts.

The software or firmware can be loaded into the information delivery system in one of many different ways. For example, instructions or other code segments stored on one or more storage media or transported through a network interface card, modem, or other interface mechanism may be loaded into the system 10 and executed to perform programmed acts.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A method comprising:

in a receiver, receiving television content associated with multiple television channels over a transport medium;

receiving enhancement data associated with the multiple television channels that have been multiplexed onto a separate delivery mechanism, announcements in the enhancement data being expected at a first addressable location in the receiver;

receiving one or more indications at the first addressable location indicating that enhancement data is available on the separate delivery mechanism, the one or more indications identifying locations of the announcements associated with the particular television channels;

determining a second addressable location other than the first addressable location of an announcement based on an indication associated with a currently tuned television channel; and processing the announcement of the currently tuned television channel.

2. The method of claim 1, wherein the processing includes processing announcements according to an Advanaced Television Enhancement Forum Specification.

3. The method of claim 1, wherein the one or more indications are received on the separate delivery mechanism.

4. The method of claim 1, wherein receiving the enhancement data over the separate delivery mechanism includes receiving the enhancement data on a data-only transport stream program.

5. The method of claim 1, wherein receiving the enhancement data over the separate delivery mechanism includes receiving the enhancement over a separate communications link.

6. The method of claim 1, wherein the first addressable location comprises-an Internet Protocol address and a port.

7. A system comprising:

a receiver adapted to tune to an audio/video portion over a transport medium;

a communication interface adapted to receive announcement data associated with the tuned audio/video content directed to a first addressable location and to receive a special announcement directed to the first addressable location, the special announcement indicating availability of the announcement data associated with the tuned audio/video program and the announcement data associated with the tuned audio/video content indicating enhancement data is being transmitted; and a controller adapted to redirect the announcement data to a second addressable location other than the first addressable location in response to the special announcement.

8. The system of claim 7, wherein the second addressable location comprises an address and a port.

9. The system of claim 8, wherein the first addressable location comprises an address and a port.

10. A method comprising:

transmitting the audio/video content over a transport medium;

multiplexing enhancement data including announcements associated with multiple audio/video programs for transmission over a separate delivery mechanism, the announcements indicating at least some of the enhancement data is being transmitted; and transmitting a predetermined indication over the separate delivery mechanism to a first addressable location at which the announcements in the enhancement data are expected, the predetermined indication being associated with one of the audio/video programs and identifying a second addressable location of one or more announcements associated with the one audio/video program.

11. The method of claim 10, further comprising multicasting the enhancement data and predetermined indications to a plurality of receivers.

12. The method of claim 10, wherein the enhancement data is according to an Advanced Television Enhancement Forum Specification.

13. The method of claim 12, wherein the first network address and port comprises an IP address and port at which announcements are expected to arrive.

14. An article comprising a machine readable tangible storage medium storing instructions that when executed cause to processor-based system to:

transmit audio/video content over a transport medium;

multiplex enhancement data including announcements associated with multiple audio/video programs for transmission over a separate delivery mechanism, the announcements indicating at least some of the enhancement data is being transmitted; and transmit a predetermined indication over the separate delivery mechanism to a first addressable location at which the announcements in the enhancement data are expected, the predetermined indication being associated with one of the audio/video programs and identifying a second addressable location of one or more announcements associated with the one audio/video program.

15. The article of claim 14, the storage medium storing instructions that when executed cause the processor-based system to multicast the enhancement data and predetermined indications to a plurality of receivers.

16. The article of claim 14, wherein the enhancement data is according to an Advanced Television Enhancement Forum Specification.

17. The article of claim 14, wherein the first addressable location comprises an address and a port.

* * * * *